(12) United States Patent
Nakamura et al.

(10) Patent No.: US 12,145,807 B2
(45) Date of Patent: Nov. 19, 2024

(54) PALLET TRANSPORT SYSTEM, PALLET TRANSPORT METHOD, AND PALLET TRANSPORT PROGRAM

(71) Applicant: DMG MORI CO., LTD., Yamatokoriyama (JP)

(72) Inventors: Takayuki Nakamura, Yamatokoriyama (JP); Hideaki Yoshioka, Yamatokoriyama (JP); Xinwei Sun, Yamatokoriyama (JP); Junya Nagata, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 696 days.

(21) Appl. No.: 17/420,042

(22) PCT Filed: Aug. 7, 2019

(86) PCT No.: PCT/JP2019/031035
§ 371 (c)(1),
(2) Date: Jun. 30, 2021

(87) PCT Pub. No.: WO2020/144887
PCT Pub. Date: Jul. 16, 2020

(65) Prior Publication Data
US 2022/0089376 A1    Mar. 24, 2022

(30) Foreign Application Priority Data
Jan. 11, 2019    (JP) ................................. 2019-003660

(51) Int. Cl.
*B65G 43/02*    (2006.01)
*B23Q 7/00*    (2006.01)
*G05B 19/4097*    (2006.01)

(52) U.S. Cl.
CPC ............... *B65G 43/02* (2013.01); *B23Q 7/00* (2013.01); *G05B 19/4097* (2013.01);
(Continued)

(58) Field of Classification Search
CPC .. B23Q 7/00; B65G 43/02; B65G 2201/0267; B65G 2203/0208; B65G 2203/041;
(Continued)

(56) References Cited

FOREIGN PATENT DOCUMENTS

CN    108747583 A    11/2018
DE    102015215406 A1 *    10/2016    ............ B25J 19/023
(Continued)

OTHER PUBLICATIONS

International Search Report issued Oct. 8, 2019 in PCT/JP2019/031035 filed Aug. 7, 2019, 2 pages.

*Primary Examiner* — Saul Rodriguez
*Assistant Examiner* — Brendan P Tighe
(74) *Attorney, Agent, or Firm* — Oblon, McClelland, Maier & Neustadt, L.L.P.

(57) ABSTRACT

A technique for detecting the completion of work of attaching a workpiece to a pallet is provided. A pallet transport system includes: a transport device for transporting a pallet to which a workpiece can be attached; a pallet housing unit for housing the pallet, a workstation in which a worker is to conduct work of attaching the workpiece to the pallet transported from the pallet housing unit; a machine tool for machining the workpiece attached to the pallet in the workstation; and a control device for controlling the transport device. The control device acquires an indicator indicating progress of the attachment work in the workstation, determines whether or not the attachment work has been completed based on the indicator, and when it is determined that (Continued)

the attachment work has been completed, transports the pallet located in the workstation to the pallet housing unit or the machine tool.

7 Claims, 15 Drawing Sheets

(52) U.S. Cl.
CPC ............... *B65G 2201/0267* (2013.01); *B65G 2203/0208* (2013.01); *B65G 2203/041* (2013.01); *B65G 2203/042* (2013.01); *B65G 2203/044* (2013.01); *B65G 2203/047* (2013.01); *G05B 2219/33099* (2013.01)

(58) Field of Classification Search
CPC ........ B65G 2203/042; B65G 2203/044; B65G 2203/047; B65G 2203/0497
See application file for complete search history.

(56) References Cited

FOREIGN PATENT DOCUMENTS

| | | | |
|---|---|---|---|
| JP | 5-261642 A | | 10/1993 |
| JP | 06277990 A | * | 10/1994 |
| JP | 9-174371 A | | 7/1997 |
| JP | 2003-170296 A | | 6/2003 |
| JP | 2013-254319 A | | 12/2013 |
| WO | WO 2017/109980 A1 | | 6/2017 |

* cited by examiner

PALLET TRANSPORT SYSTEM, PALLET TRANSPORT METHOD, AND PALLET TRANSPORT PROGRAM

TECHNICAL FIELD

The present disclosure relates to control of transport of a pallet in a pallet transport system.

BACKGROUND ART

A pallet transport system is known for successively machining multiple workpieces according to a preset schedule. With regard to a pallet transport system, PTL 1 (Japanese Patent Laying-Open No. 09-174371) discloses "a pallet pool type machining apparatus capable of improving design and manufacture flexibility and expandability at the time of new construction of the apparatus, at the time of additional expansion of devices, and at the time of change in arrangement in accordance with the needs of a user, and also capable of achieving reduced cost" (see "Abstract").

CITATION LIST

Patent Literature

PTL 1: Japanese Patent Laying-Open No. 09-174371

SUMMARY OF INVENTION

Technical Problem

A pallet transport system has a workstation in which a worker is to conduct work. The worker conducts various types of work on a pallet transported into the workstation. As one example, the worker conducts work of attaching a workpiece to the pallet transported into the workstation. When the work of attaching the workpiece is completed, the worker performs an operation for indicating the work completion (hereinafter also referred to as "work completion operation"). In response to receiving the work completion operation, the pallet transport system starts to transport the pallet located in the workstation.

The worker may forget to perform the work completion operation. If the worker forgets to perform the work completion operation, the transport of the pallet is not started. This results in delayed machining of workpieces, causing reduced productivity of workpieces. There has therefore been a demand for a technique of automatically detecting the completion of work of attaching a workpiece to a pallet.

The present disclosure has been made to solve the problem as described above, and an object in one aspect is to provide a pallet transport system capable of detecting the completion of work of attaching a workpiece to a pallet. An object in another aspect is to provide a pallet transport method capable of detecting the completion of work of attaching a workpiece to a pallet. An object in another aspect is to provide a pallet transport program capable of detecting the completion of work of attaching a workpiece to a pallet.

Solution to Problem

In one example of the present disclosure, a pallet transport system includes: a transport device for transporting a pallet to which a workpiece can be attached; a pallet housing unit for housing the pallet, the pallet housing unit being one of destinations to which the pallet is to be transported by the transport device; a workstation in which a worker is to conduct work of attaching the workpiece to the pallet transported from the pallet housing unit, the workstation being one of destinations to which the pallet is to be transported by the transport device; a machine tool for machining the workpiece attached to the pallet in the workstation, the machine tool being one of destinations to which the pallet is to be transported by the transport device; and a control device for controlling the transport device. The control device acquires an indicator indicating progress of the attachment work in the workstation, determines whether or not the attachment work has been completed based on the indicator, and when it is determined that the attachment work has been completed, transports the pallet located in the workstation to the pallet housing unit or the machine tool.

Preferably, the pallet transport system further includes a camera arranged to take an image of at least one of the pallet located in the workstation, and the worker conducting the attachment work in the workstation. The control device acquires the image obtained from the camera as the indicator, and determines whether or not the attachment work has been completed based on the image.

Preferably, the workstation includes a door that can be opened and closed for separating a place to which the pallet is transported in the workstation from a work area in which the attachment work is conducted, and an open/close sensor for sensing an open/closed state of the door. The control device acquires the open/closed state sensed by the open/close sensor as the indicator, and determines that the attachment work has been completed in response to the open/close sensor sensing the closed state of the door.

Preferably, the workstation includes a clamp sensor for sensing a physical quantity indicating strength of fixation of the workpiece to a jig attached to the pallet. The control device acquires the physical quantity sensed by the clamp sensor as the indicator, and determines that the attachment work has been completed in response to magnitude of the physical quantity exceeding a prescribed value.

Preferably, the workstation further includes an area sensor. The area sensor includes a light projecting unit, and a light receiving unit for receiving light emitted from the light projecting unit and outputting intensity of the light. The light projecting unit is arranged such that the light emitted from the light projecting unit passes between the place to which the pallet is transported in the workstation and the work area in which the attachment work is conducted. The control device acquires the intensity of the light output by the light receiving unit as the indicator, and determines that the attachment work has been completed in response to a time during which the intensity of the light is higher than a prescribed value exceeding a prescribed time.

In another example of the present disclosure, a pallet transport method in a pallet transport system is provided. The pallet transport system includes: a transport device for transporting a pallet to which a workpiece can be attached; a pallet housing unit for housing the pallet, the pallet housing unit being one of destinations to which the pallet is to be transported by the transport device; a workstation in which a worker is to conduct work of attaching the workpiece to the pallet transported from the pallet housing unit, the workstation being one of destinations to which the pallet is to be transported by the transport device; and a machine tool for machining the workpiece attached to the pallet in the workstation, the machine tool being one of destinations to which the pallet is to be transported by the transport device. The pallet transport method includes: acquiring an indicator indicating progress of the attachment work; determining whether or not the attachment work has been completed based on the indicator; and when it is determined that the attachment work has been completed, transporting the pallet located in the workstation to the pallet housing unit or the machine tool.

In another example of the present disclosure, a pallet transport program for execution in a pallet transport system is provided. The pallet transport system includes: a transport device for transporting a pallet to which a workpiece can be attached; a pallet housing unit for housing the pallet, the pallet housing unit being one of destinations to which the pallet is to be transported by the transport device; a workstation in which a worker is to conduct work of attaching the workpiece to the pallet transported from the pallet housing unit, the workstation being one of destinations to which the pallet is to be transported by the transport device; and a machine tool for machining the workpiece attached to the pallet in the workstation, the machine tool being one of destinations to which the pallet is to be transported by the transport device. The pallet transport program causes the pallet transport system to: acquire an indicator indicating progress of the attachment work; determine whether or not the attachment work has been completed based on the indicator; and when it is determined that the attachment work has been completed, transport the pallet located in the workstation to the pallet housing unit or the machine tool.

Advantageous Effects of Invention

In one aspect, the completion of work of attaching a workpiece to a pallet can be detected.

The foregoing and other objects, features, aspects and advantages of the present invention will become more apparent from the following detailed description of the present invention when taken in conjunction with the accompanying drawings.

DESCRIPTION OF EMBODIMENTS

Figure 1:
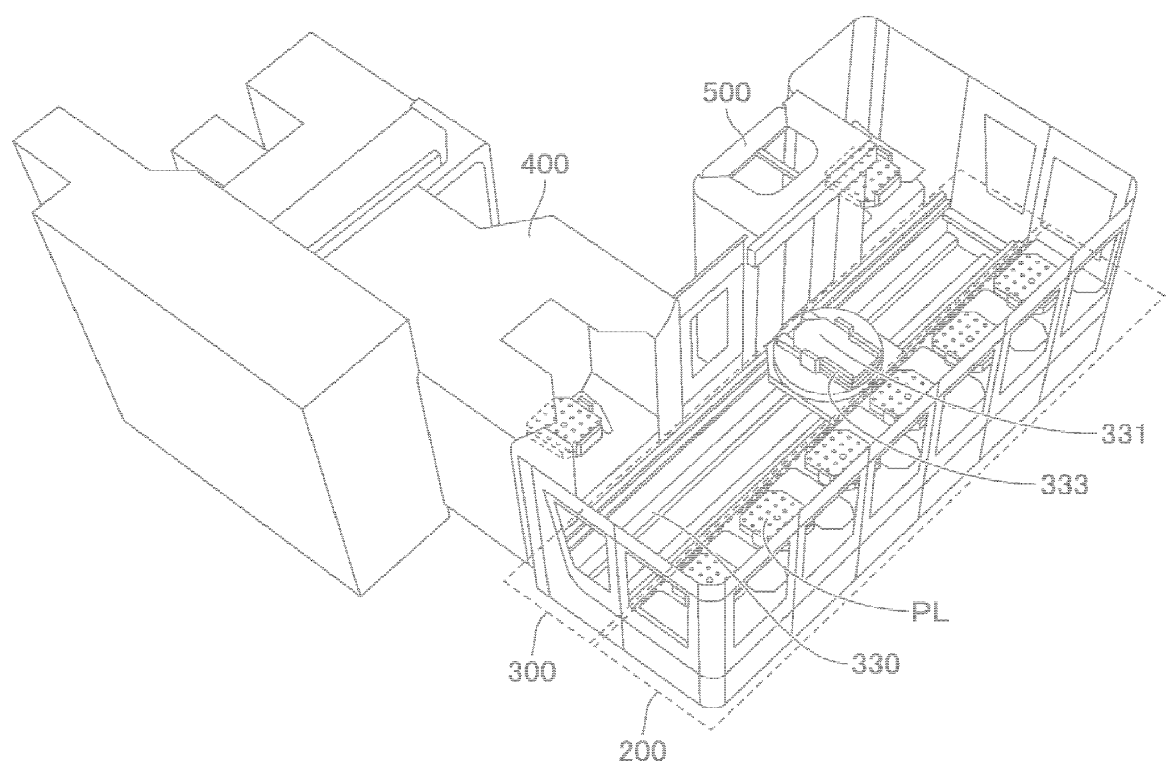
FIG. 1 is a diagram showing an outer appearance of a pallet transport system.

In the following, embodiments according to the present invention will be described with reference to the drawings. The same parts and components have the same reference characters allotted in the description below and their labels and functions are also the same. Therefore, detailed description thereof will not be repeated. The embodiments and variations described below may be selectively combined as appropriate.

<A. Outer Appearance of Pallet Transport System 10>

Referring to FIG. 1, a pallet transport system 10 is described. FIG. 1 is a diagram showing an outer appearance of pallet transport system 10.

As shown in FIG. 1, pallet transport system 10 includes one or more housing units 200, one or more transport devices 300, one or more machine tools 400, and one or more workstations 500.

Housing unit 200 is one of destinations to which a pallet PL is to be transported by transport device 300, and serves as a place for housing pallet PL. A plurality of pallets PL may be housed in housing unit 200. Housing unit 200 stores an empty pallet to which a workpiece has not yet been attached, a pallet to which an unmachined workpiece has been attached, a pallet to which a workpiece in the course of being machined has been attached, a pallet to which a machined workpiece has been attached, and the like.

Transport device 300 transports a specified pallet PL to a specified location. More specifically, transport device 300 includes a rail 330 and a dolly 331. Dolly 331 has a fork portion 333 configured such that it can be driven in a direction orthogonal to rail 330 (that is, a direction orthogonal to the direction in which dolly 331 runs). Dolly 331 is configured, for example, to be movable along rail 330 by a servo motor 335 described later herein (see FIG. 2). Dolly 331 moves along rail 330 to the position of a pallet PL to be transported, and uses fork portion 333 to place pallet PL to be transported onto dolly 331. Dolly 331 then moves along rail 330 to a specified destination, and uses fork portion 333 to transport pallet PL to be transported into the destination.

Machine tool 400 is one of destinations to which pallet PL is to be transported by transport device 300. Machine tool 400 machines the workpiece attached to pallet PL transported therein, in accordance with a predesigned machining program. When the machining of the workpiece is completed, pallet PL in machine tool 400 is transported to housing unit 200 or workstation 500 by transport device 300.

Workstation 500 is one of destinations to which pallet PL is to be transported by transport device 300. In workstation 500, a worker conducts various types of work on pallet PL transported therein. As one example, the worker conducts work of attaching a workpiece to be machined to transported pallet PL, or work of removing a machined workpiece from pallet PL, in workstation 500. When the work on pallet PL is completed, the worker performs an operation for indicating the work completion. In response to this, pallet PL in workstation 500 is transported to housing unit 200 or machine tool 400 by transport device 300.

<B. Apparatus Configuration of Pallet Transport System 10>

Figure 2:
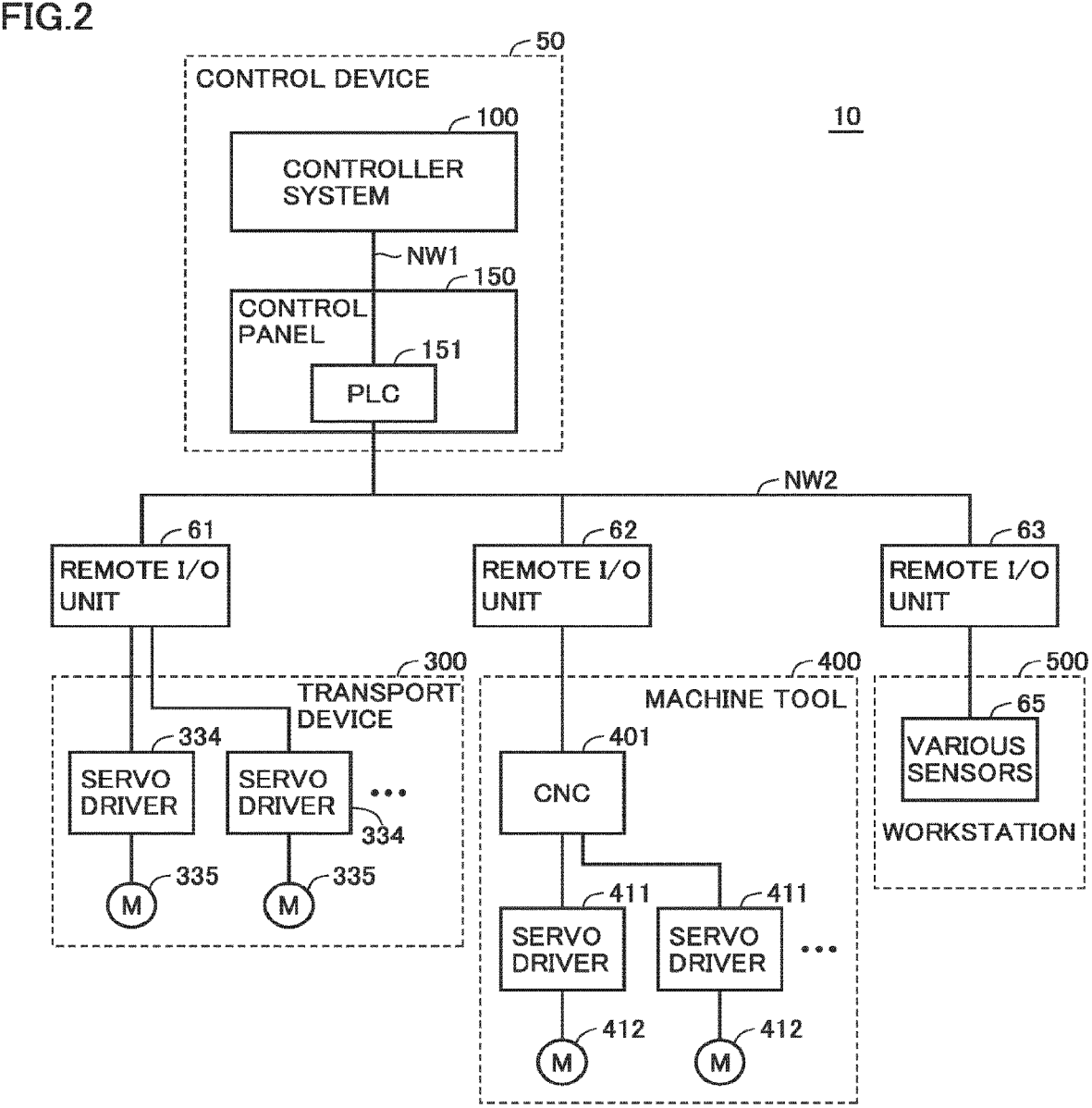
FIG. 2 is a diagram showing an example apparatus configuration of the pallet transport system.

FIG. 2 is a diagram showing an example apparatus configuration of pallet transport system 10. Referring to FIG. 2, an example apparatus configuration of pallet transport system 10 is described.

As shown in FIG. 2, pallet transport system 10 includes a control device 50, remote I/O (Input/Output) units 61 to 63, transport device 300, machine tool 400, and workstation 500.

As used herein, "control device 50" refers to a device that controls pallet transport system 10. Control device 50 may have any device configuration. Control device 50 may be formed of a single or a plurality of control units. In the example of FIG. 2, control device 50 is formed of a control system 100 and a control panel 150.

Control panel 150 controls various industrial devices for automating a machining process. Control panel 150 includes a PLC (Programmable Logic Controller) 151.

Control system 100 and PLC 151 are connected to a network NW1. Control system 100 and PLC 151 may be communicatively connected in a wired or wireless manner. EtherNET® or the like is employed for network NW1. Control system 100 sends a control command to PLC 151 over network NW1. With this control command, control system 100 specifies a pallet PL to be transported, specifies a destination of pallet PL to be transported, specifies a start/stop of transport of pallet PL to be transported, and the like.

Remote I/O units 61 to 63 and PLC 151 are connected to a network NW2. For network NW2, it is preferable to employ a field network that performs constant-cycle communication to ensure a time of data arrival. As the field network that performs such constant-cycle communication, EtherCAT®, EtherNet/IP®, CC-Link®, CompoNet®, or the like is employed.

Transport device 300 includes one or more servo drivers 334 and one or more servo motors 335. Remote I/O unit 61 is installed in or around transport device 300. Remote I/O unit 61 intermediates data exchange between various drive units (for example, servo driver 334) in transport device 300 and PLC 151. Servo driver 334 receives a control command from PLC 151 via remote I/O unit 61 in a constant cycle, and controls driving of servo motor 335 in accordance with this control command. As one example, one servo motor 335 controls driving of aforementioned dolly 331 (see FIG. 1), and the other servo motor 335 controls driving of aforementioned fork portion 333 (see FIG. 1).

Servo driver 334 sequentially receives input of a target rotational speed (or a target position) from PLC 151, and controls servo motor 335 such that servo motor 335 rotates at the target rotational speed. More specifically, servo driver 334 calculates an actual rotational speed (or an actual position) of servo motor 335 from a feedback signal of an encoder (not shown) for servo motor 335, and raises the rotational speed of servo motor 335 when this actual rotational speed is lower than the target rotational speed, and lowers the rotational speed of servo motor 335 when this actual rotational speed is higher than the target rotational speed. In this manner, servo driver 334 brings the rotational speed of servo motor 335 closer to the target rotational speed while sequentially receiving feedback on the rotational speed of servo motor 335. Transport device 300 can thus move pallet PL to an appropriate destination.

Machine tool 400 includes a CNC (Computer Numerical Control) 401, servo drivers 411, and servo motors 412. Remote I/O unit 62 is installed in or around machine tool 400. Remote I/O unit 62 intermediates data exchange between various drive units (for example, CNC 401) in machine tool 400 and PLC 151. As with servo driver 334 described above, servo driver 411 receives a control command from PLC 151 via remote I/O unit 62 in a constant cycle, and controls driving of servo motor 412 in accordance with this control command.

Workstation 500 includes various sensors 65. Various sensors 65 acquire an indicator indicating the progress of work of attaching a workpiece to pallet PL (hereinafter also referred to as "work progress indicator"). Various sensors 65 include a camera 510 described later herein (see FIG. 4), an open/close sensor 511 described later herein (see FIGS. 5 and 6), a clamp sensor 513 described later herein (see FIGS. 5 and 6), an area sensor 515 described later herein (see FIG. 5), and the like.

Remote I/O unit 63 is installed in or around workstation 500. Remote I/O unit 63 intermediates data exchange between various sensors 65 in workstation 500 and PLC 151. Detected values from various sensors 65 are sent to PLC 151 via remote I/O unit 63 in a constant cycle.

<C. Functional Configuration of Control Device 50>

Figure 3:
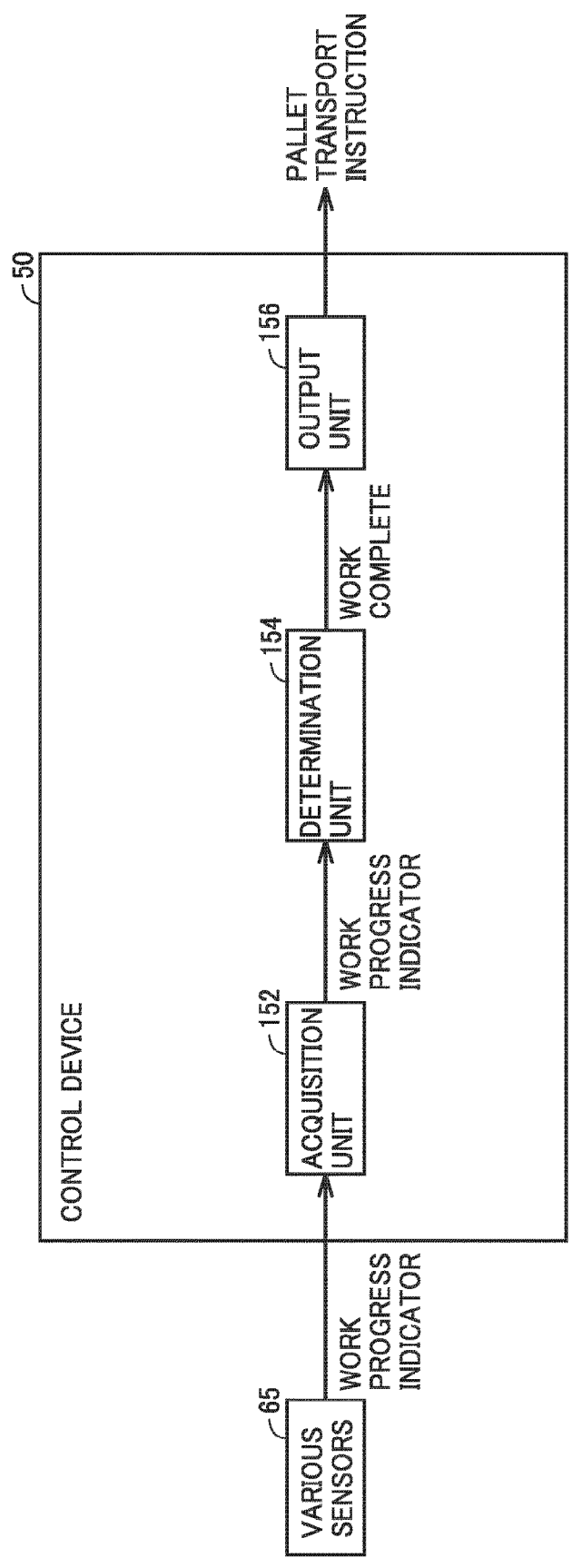
FIG. 3 is a diagram showing an example functional configuration of a control device.

Referring to FIGS. 3 to 6, the functions of aforementioned control device 50 (see FIG. 2) will be described. FIG. 3 is a diagram showing an example functional configuration of control device 50.

As shown in FIG. 3, control device 50 includes, as a functional configuration, an acquisition unit 152, a determination unit 154, and an output unit 156. This functional configuration is mounted on control system 100 or PLC 151 forming control device 50. In one aspect, part of acquisition unit 152, determination unit 154, and output unit 156 is mounted on control system 100, and the rest is mounted on PLC 151. In another aspect, acquisition unit 152, determination unit 154, and output unit 156 are entirely mounted on control system 100. In another aspect, acquisition unit 152, determination unit 154, and output unit 156 are entirely mounted on PLC 151.

In the following, the function of acquisition unit 152, the function of determination unit 154, and the function of output unit 156 will be successively described.

(C1. Acquisition Unit 152)

Acquisition unit 152 acquires an indicator indicating the progress of work of attaching the workpiece to pallet PL (that is, the work progress indicator) from aforementioned various sensors 65 (see FIG. 2) provided in workstation 500. Acquisition unit 152 may acquire one or a plurality of types of work progress indicators. The acquired work progress indicator is output to determination unit 154.

In the following, specific examples 1 to 4 of the work progress indicator acquired by acquisition unit 152 will be successively described.

(a) Specific Example 1 of Work Progress Indicator

Figure 4:
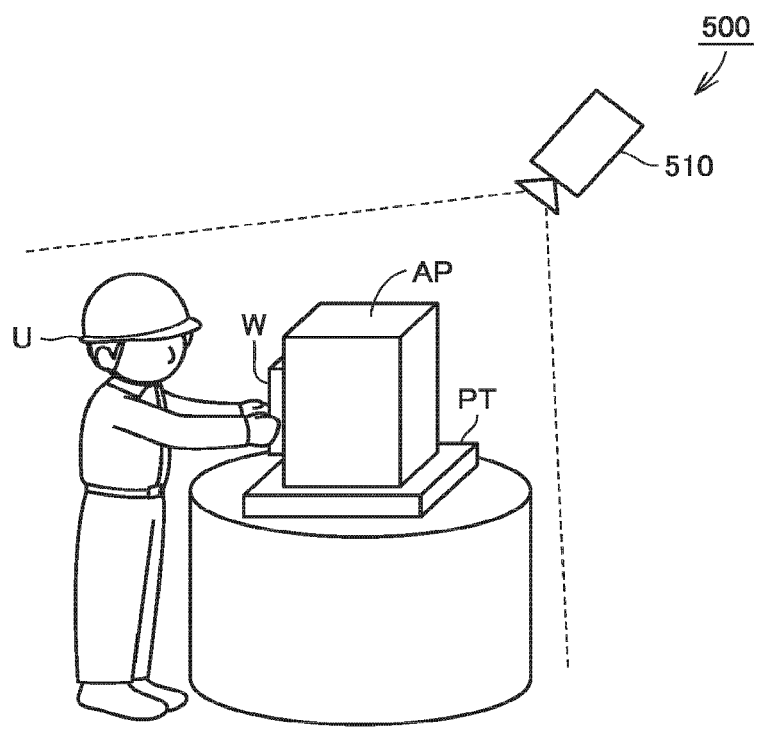
FIG. 4 is a diagram representing an inside of a workstation in a perspective view.

First, referring to FIG. 4, specific example 1 of the work progress indicator is described. FIG. 4 is a diagram representing an inside of workstation 500 in a perspective view.

In the example of FIG. 4, a jig AP is attached to pallet PL. Jig AP is an angle plate, for example. A workpiece W to be machined may be attached to each part of each surface of jig AP. Workpiece W to be machined is attached to jig AP by a worker U.

As shown in FIG. 4, camera 510, which is one example of aforementioned various sensors 65 (see FIG. 2), is provided in workstation 500. Camera 510 is arranged to take images of at least one of pallet PL transported into workstation 500, and worker U conducting work of attaching workpiece W to pallet PL in workstation 500 (typically, a work area of worker U). The images taken by camera 510 represent a situation of worker U, or the contents of work on pallet PL, and can therefore serve as the work progress indicator.

One or a plurality of cameras 510 may be arranged in workstation 500. If a plurality of cameras 510 are arranged, one of cameras 510 is provided to take images of worker U, and the other camera(s) 510 are provided to take images of pallet PL. Alternatively, the plurality of cameras 510 may be provided to take images of pallet PL from different directions.

(b) Specific Example 2 of Work Progress Indicator

Figure 5:
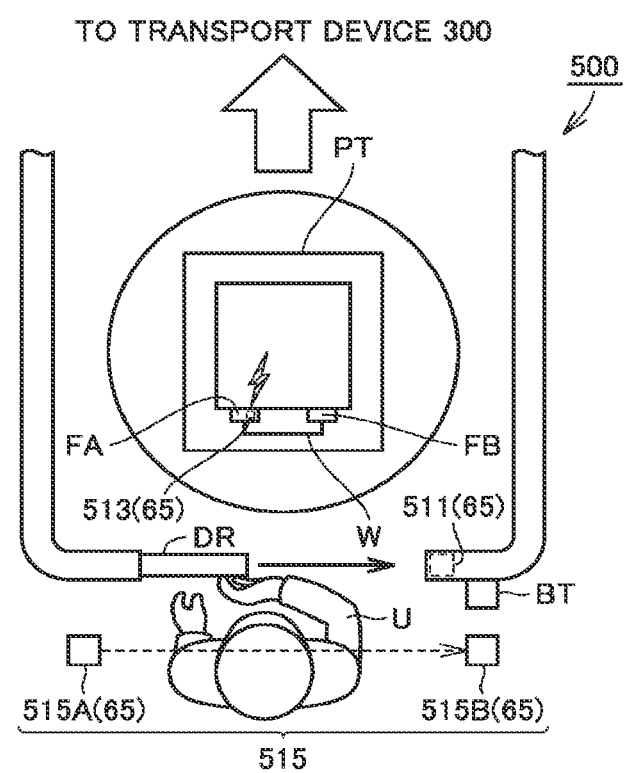
FIG. 5 is a diagram representing the inside of the workstation in a top view.
Figure 6:
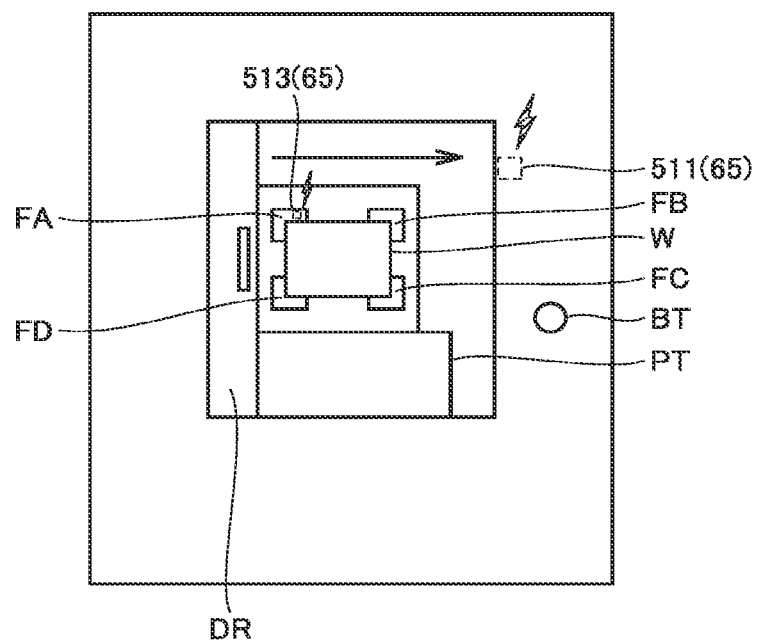
FIG. 6 is a diagram representing the inside of the workstation in a front view.
Figure 7:
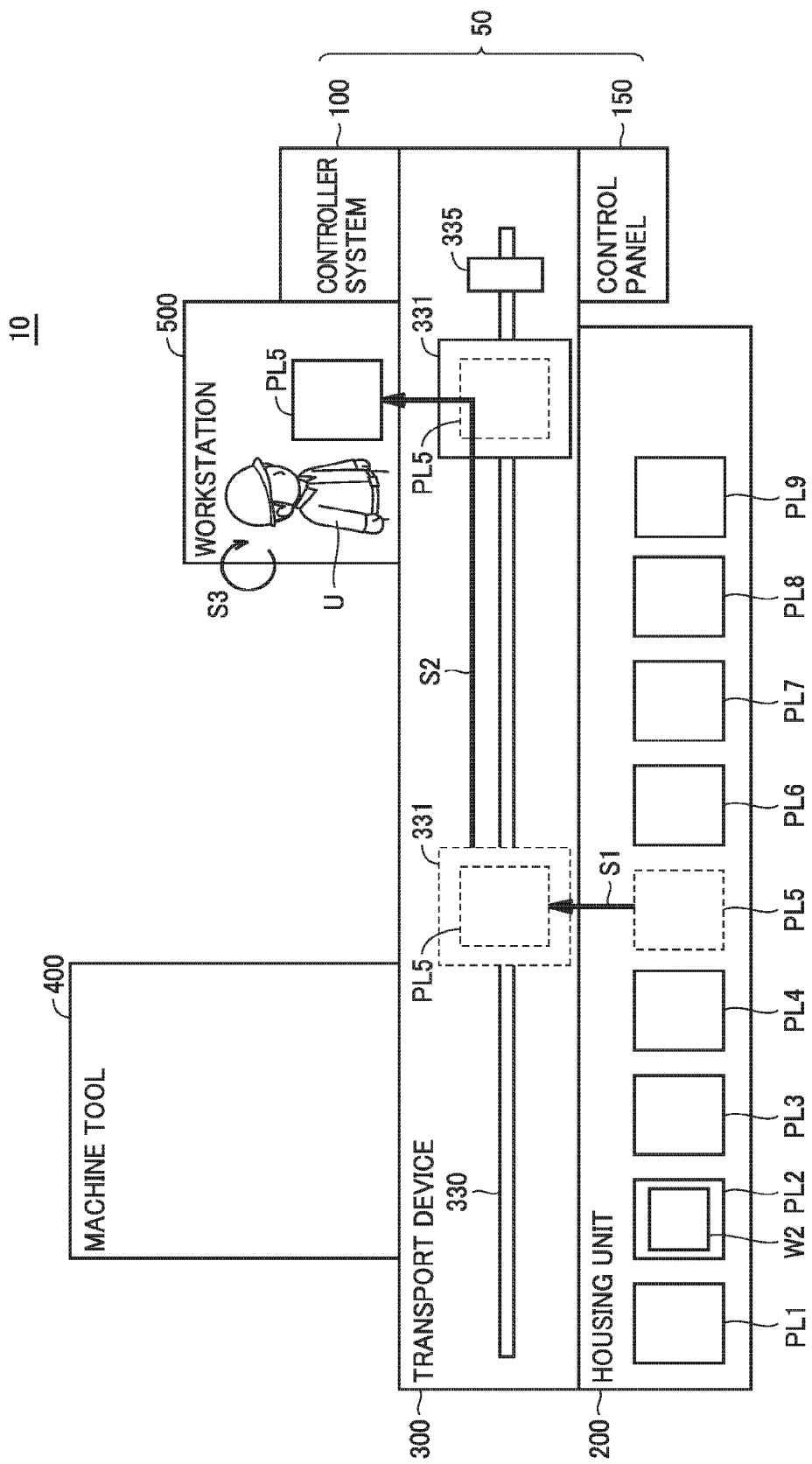
FIG. 7 is a diagram showing part of a working process in the pallet transport system.
Figure 8:
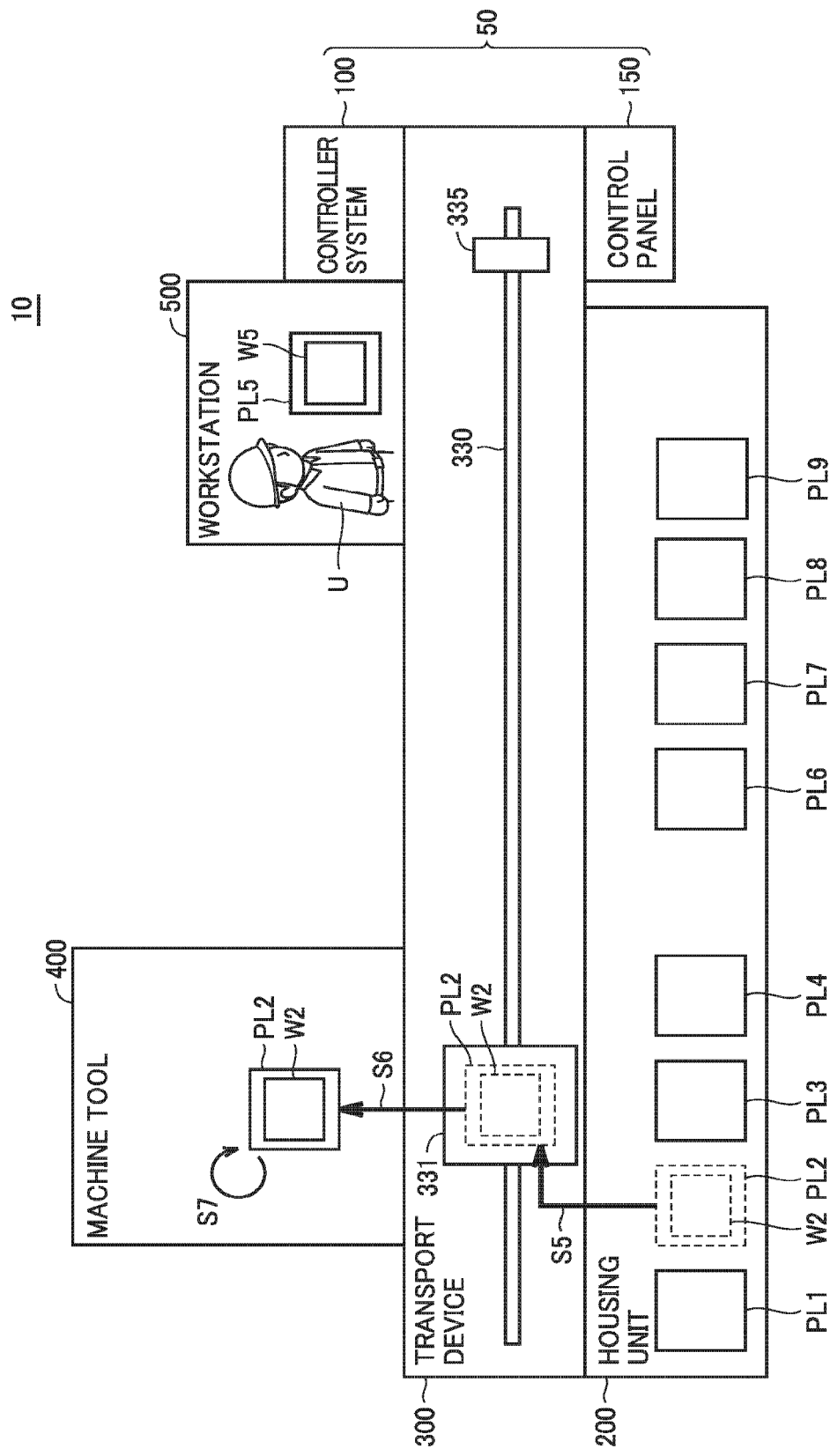
FIG. 8 is a diagram showing part of the working process in the pallet transport system.
Figure 9:
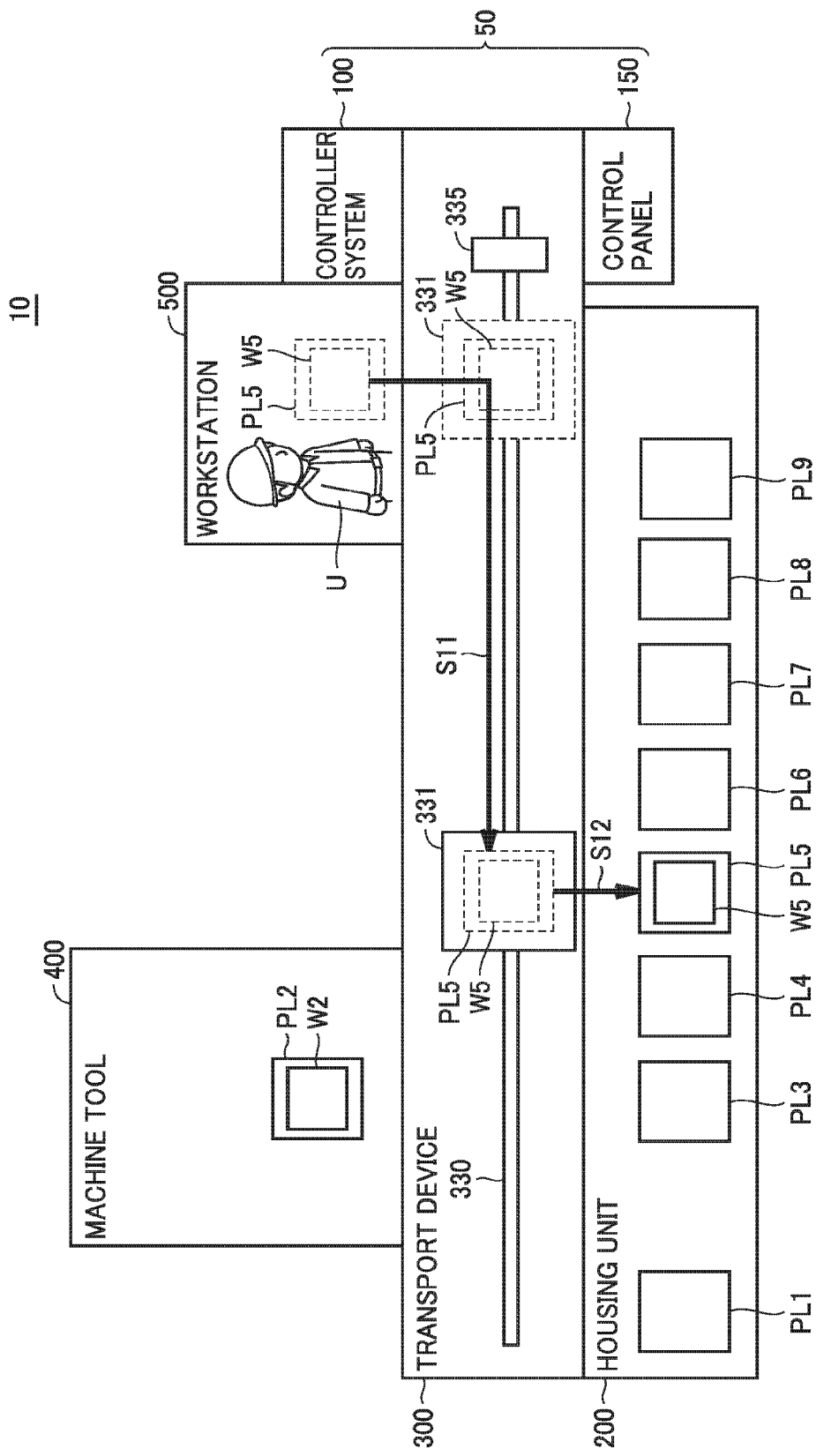
FIG. 9 is a diagram showing part of the working process in the pallet transport system.
Figure 10:
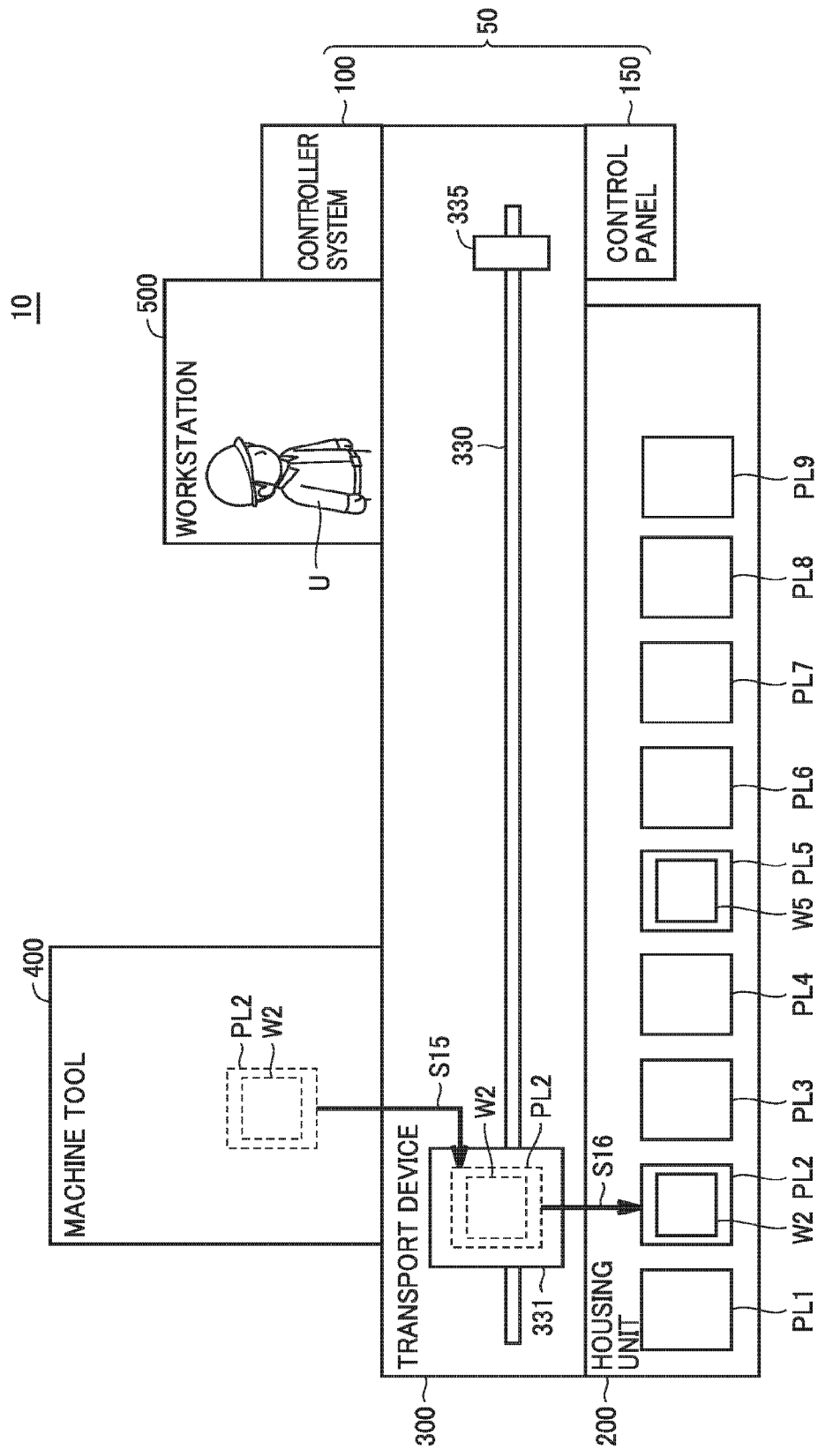
FIG. 10 is a diagram showing part of the working process in the pallet transport system.

Referring to FIGS. 5 and 6, specific example 2 of the work progress indicator is now described. FIG. 5 is a diagram representing the inside of workstation 500 in a top view. FIG. 6 is a diagram representing the inside of workstation 500 in a front view.

As shown in FIGS. 5 and 6, a door DR is provided so as to separate a place to which pallet PL is transported in workstation 500 from a work area in which worker U conducts the work of attaching workpiece W. Acquisition unit 152 acquires an open/closed state of door DR as the work progress indicator.

More specifically, worker U opens door DR in response to pallet PL being transported into workstation 500, and starts the work of attaching workpiece W. When the work of attaching workpiece W is completed, worker U closes door DR and depresses a work completion button BT. Work completion button BT may be a physical button, or a button displayed on a touch panel and the like. In response to the depression of work completion button BT, pallet PL is transported out of workstation 500. In this manner, worker U opens door DR while performing the work of attaching workpiece W, and closes door DR in response to the work of attaching workpiece W being completed. Therefore, the open/closed state of door DR can serve as an indicator indicating the progress of the work of attaching workpiece W.

Open/close sensor 511 is provided on door DR for sensing the open/closed state of door DR. Open/close sensor 511 is one example of aforementioned various sensors 65 (see FIG. 2). Open/close sensor 511 has a wireless communication function. While door DR is open, open/close sensor 511 outputs a signal indicating an open state to aforementioned remote I/O unit 63 (see FIG. 2). While door DR is closed, on the other hand, open/close sensor 511 outputs a signal indicating an open state to aforementioned remote I/O unit 63. Remote I/O unit 63 transmits the open/closed state received from open/close sensor 511 to control device 50 over aforementioned network NW2 (see FIG. 2) in a constant cycle. Acquisition unit 152 of control device 50 thus acquires the open/closed state of door DR.

(c) Specific Example 3 of Work Progress Indicator

Still referring to FIGS. 5 and 6, specific example 3 of the work progress indicator is described. Acquisition unit 152 acquires, as the work progress indicator, a physical quantity indicating strength of fixation of workpiece W to jig AP attached to pallet PT. This physical quantity is sensed by clamp sensor 513, for example. Clamp sensor 513 is one example of aforementioned various sensors 65 (see FIG. 2).

Worker U uses fixing tools FA to FD to fix workpiece W to jig AP. Clamp sensor 513 senses, for example, clamping strength of fixing tool FA. Before workpiece W is attached to jig AP, the clamping strength sensed by clamp sensor 513 is substantially zero. As the work of attaching workpiece W to jig AP progresses, the clamping strength sensed by clamp sensor 513 increases. In this manner, the clamping strength varies with the progress of the work of attaching workpiece W, and can therefore serve as the work progress indicator.

Clamp sensor 513 has a wireless communication function, and transmits the sensed clamping strength to aforementioned remote I/O unit 63 (see FIG. 2) in a constant cycle. Remote I/O unit 63 transmits the clamping strength received from clamp sensor 513 to control device 50 over aforementioned network NW2 (see FIG. 2) in a constant cycle. Acquisition unit 152 of control device 50 thus acquires the clamping strength from clamp sensor 513.

While one clamp sensor 51 is illustrated in the example of FIGS. 5 and 6, a plurality of clamp sensors 513 may be provided. In this case, each of the plurality of clamp sensors 513 is provided for a corresponding one of fixing tools FA to FD.

(d) Specific Example 4 of Work Progress Indicator

Still referring to FIGS. 5 and 6, specific example 4 of the work progress indicator is described. Acquisition unit 152 acquires an output value from area sensor 515 as the work progress indicator. Area sensor 515 is one example of aforementioned various sensors 65 (see FIG. 2).

Area sensor 515 includes a light projecting unit 515A and a light receiving unit 515B. Light projecting unit 515A emits light toward light receiving unit 515B. Light receiving unit 515B receives the light emitted from light projecting unit 515A, and outputs intensity of this light. Light projecting unit 515A and light receiving unit 515B are arranged such that the light emitted from light projecting unit 515A is blocked by worker U conducting the work. Stated another way, light projecting unit 515A and light receiving unit 515B are arranged such that the light emitted from light projecting unit 515A passes between the place to which pallet PL is transported in workstation 500 and the work area in which the work of attaching workpiece W is conducted.

During the attachment work, worker U is near pallet PL, causing the light emitted from light projecting unit 515A to be blocked by worker U. When the attachment work is completed, worker U moves away from the work area. After the work is completed, therefore, the light emitted from light projecting unit 515A is not blocked by worker U. In this manner, the intensity of the light received by light receiving unit 515B from light projecting unit 515A varies with the progress of the work of attaching workpiece W, and can therefore serve as the work progress indicator.

Light receiving unit 515B outputs the sensed light intensity to aforementioned remote I/O unit 63 (see FIG. 2). Remote I/O unit 63 transmits the light intensity received from light receiving unit 515B to control device 50 over aforementioned network NW2 (see FIG. 2) in a constant cycle. Acquisition unit 152 of control device 50 thus acquires the intensity of the light received by light receiving unit 515B.

(C2. Determination Unit 154)

The function of determination unit 154 shown in FIG. 3 is now described. Determination unit 154 determines, based on the work progress indicator acquired by acquisition unit 152, whether or not the work of attaching workpiece W has been completed. In so doing, determination unit 154 determines whether or not the attachment work has been completed with a determination method depending on the type of work progress indicator.

In the following, methods 1 to 4 for determining the work completion by determination unit 154 will be successively described. Determination unit 154 may determine whether or not the attachment work has been completed in accordance with a determination result from any one of the following determination methods 1 to 4, or in accordance with a combination of determination results from two or more of the following determination methods 1 to 4.

(a) Method 1 for Determining Work Completion

First, referring to FIG. 4, method 1 for determining the work completion is described. In this determination method, determination unit 154 uses images taken by camera 510 as the work progress indicator. As described above, camera 510 takes images of the worker, pallet PL and the like in workstation 500.

Determination unit 154 performs predetermined image processing on the images taken by camera 510, to determine whether or not the work of attaching workpiece W has been completed. Various algorithms may be employed for the method for determining whether or not the work of attaching workpiece W has been completed using the taken images.

In one aspect, an image representing a completed state where workpiece W has been attached to pallet PL (hereinafter also referred to as "reference image") is prepared in advance. This reference image may be a two-dimensional or three-dimensional image. Determination unit 154 compares the input images obtained from camera 510 with the reference image, and calculates the degree of similarity between the reference image and the input images. An appropriate algorithm is employed for this method for calculating the degree of similarity. As one example, SSD (Sum of Squared Difference), SAD (Sum of Absolute Difference), NCC (Normalized Cross-Correlation), ZNCC (Zero-mean Normalized Cross-Correlation), or the like may be employed as this method for calculating the degree of similarity.

Determination unit 154 determines that the work of attaching workpiece W has been completed in response to the calculated degree of similarity exceeding a prescribed threshold. When the calculated degree of similarity is equal to or less than the prescribed threshold, on the other hand, determination unit 154 determines that the work of attaching workpiece W has not been completed.

In another aspect, in the images taken by camera 510, the work area in which the work of attaching workpiece W to pallet PL is performed is set in advance.

Determination unit 154 uses an existing face-sensing algorithm or person-sensing algorithm to sense the worker in the taken images successively obtained, and measures a time during which the worker is not in the work area. Determination unit 154 then determines that the work of attaching workpiece W has been completed in response to the measured time exceeding a prescribed time (for example, five minutes). When the measured time is equal to or less than the prescribed time, on the other hand, determination unit 154 determines that the work of attaching workpiece W has not been completed.

(b) Method 2 for Determining Work Completion Referring to FIGS. 5 and 6, method 2 for determining the work completion is now described. In this determination method, determination unit 154 uses an output value from open/close sensor 511 as the work progress indicator.

As described above, worker U opens door DR while performing the work of attaching workpiece W, and closes door DR in response to the work of attaching workpiece W being completed. Focusing on this feature, determination unit 154 determines that the work of attaching workpiece W has been completed in response to open/close sensor 511 sensing the closed state of door DR. More specifically, determination unit 154 determines that the work of attaching workpiece W has been completed in response to the open/closed state of door DR changing from the open state to the closed state. While open/close sensor 511 is sensing the open state of door DR, on the other hand, determination unit 154 determines that the work of attaching workpiece W has not been completed.

Preferably, determination unit 154 determines that the work of attaching workpiece W has been completed in response to the closed state continuing for at least a prescribed time since a change in the open/closed state of door DR from the open state to the closed state. That is, determination unit 154 determines that the work of attaching workpiece W has not been completed when the worker repeatedly opens and closes door DR within a short period of time.

(c) Method 3 for Determining Work Completion

Referring to FIGS. 5 and 6, method 3 for determining the work completion is now described. In this determination method, determination unit 154 uses an output value from clamp sensor 513 as the work progress indicator.

As described above, before workpiece W is attached to jig AP, the clamping strength sensed by clamp sensor 513 is substantially zero. As the work of attaching workpiece W to jig AP progresses, the clamping strength sensed by clamp sensor 513 increases. Focusing on this feature, determination unit 154 determines that the work of attaching workpiece W has been completed in response to the magnitude of the clamping strength sensed by clamp sensor 513 exceeding a prescribed value. While the magnitude of the clamping strength sensed by clamp sensor 513 is equal to or less than the prescribed value, on the other hand, determination unit 154 determines that the work of attaching workpiece W has not been completed.

Preferably, determination unit 154 determines that the work of attaching workpiece W has been completed in response to a time during which the magnitude of the clamping strength sensed by clamp sensor 513 is higher than the prescribed value exceeding a prescribed time. That is, determination unit 154 determines that the work of attaching workpiece W has not been completed when the magnitude of the clamping strength sensed by clamp sensor 513 is only momentarily higher than the prescribed value. Erroneous determination due to noise of clamp sensor 513 is thus suppressed.

If a plurality of clamp sensors 513 are provided, determination unit 154 determines that the work of attaching workpiece W has been completed in response to the magnitudes of all sensed clamping strengths exceeding the prescribed value. When at least one of the sensed clamping strengths is equal to or less than the prescribed value, on the other hand, determination unit 154 determines that the work of attaching workpiece W has not been completed.

(d) Method 4 for Determining Work Completion

Referring to FIGS. 5 and 6, method 4 for determining the work completion is now described. In this determination method, determination unit 154 uses an output value from area sensor 515 as the work progress indicator.

As described above, during the attachment work, worker U is near pallet PL, causing the light emitted from light projecting unit 515A to be blocked by worker U. When the attachment work is completed, worker U moves away from the work area. After the work is completed, therefore, the light emitted from light projecting unit 515A is not blocked by worker U. Focusing on this feature, determination unit 154 determines that the work of attaching workpiece W has been completed in response to a time during which the light intensity sensed by light receiving unit 515B is higher than a prescribed value exceeding a prescribed time.

More specifically, determination unit 154 starts to measure a time in response to the sensed light intensity exceeding the prescribed value. The measurement of this time is continued while the sensed light intensity is higher than the prescribed value. When the sensed light intensity falls below the prescribed value, the measured time is cleared. Determination unit 154 determines that the work of attaching workpiece W has been completed in response to the measured time exceeding the prescribed time.

(C3. Output Unit 156)

The function of output unit 156 shown in FIG. 3 is now described. When determination unit 154 determines that the work of attaching workpiece W has been completed, output unit 156 forcibly transports pallet PL located in workstation 500 to housing unit 200 or machine tool 400. In so doing, output unit 156 may start the transport of pallet PL with or without permission from the worker.

Since the transport of pallet PL is forcibly started upon determination that the work of attaching workpiece W has been completed, the working process is moved to the next step even if the worker forgets to perform the work completion operation (for example, the operation of depressing work completion button BT shown in FIGS. 5 and 6). As a result, reduction in productivity of workpieces due to the work completion operation being forgotten is prevented.

<D. Working Process>

Referring to FIGS. 7 to 10, an example working process in pallet transport system 10 is described. FIGS. 7 to 10 are diagrams showing an example working process in pallet transport system 10 in time sequence.

Control system 100 controls driving of pallets PL1 to PL9 according to schedule information 124 described later herein (see FIG. 12).

Assume that, at certain timing, a time has arrived to transport pallet PL5. In response to this, control system 100 sends a command to control panel 150 to transport pallet PL5 to workstation 500. In response to this command, control panel 150 moves dolly 331 such that dolly 331 is positioned in front of pallet PL5 located in housing unit 200. Control panel 150 then drives fork portion 333 of dolly 331 (see FIG. 1), to place pallet PL5 onto dolly 331 (step S).

Next, control panel 150 moves dolly 331 such that dolly 331 is positioned in front of workstation 500. Control panel 150 then drives fork portion 333 of dolly 331 (see FIG. 1), to transport pallet PL5 into workstation 500 (step S2).

In response to pallet PL5 being transported into workstation 500, worker U starts the work of attaching workpiece W5 to pallet PL5 (step S3).

Next, assume that a time has arrived to machine workpiece W2. In response to this, control system 100 sends a command to control panel 150 to transport pallet PL2 with workpiece W2 attached thereto to machine tool 400. In response to this command, control panel 150 moves dolly 331 such that dolly 331 is positioned in front of pallet PL2. Control panel 150 then drives fork portion 333 of dolly 331, to place pallet PL2 onto dolly 331 (step S5).

Next, control panel 150 moves dolly 331 such that dolly 331 is positioned in front of machine tool 400. Control panel 150 then drives fork portion 333 of dolly 331, to transport pallet PL2 into machine tool 400 (step S6).

In response to pallet PL2 being transported into machine tool 400, control system 100 sends a machining start command to machine tool 400. In response to this machining start command, machine tool 400 starts to machine workpiece W2 attached to pallet PL2 (step S7).

Next, assume that the work of attaching workpiece W5 by worker U has been completed. Then, in response to worker U performing the work completion operation (for example, the operation of depressing work completion button BT shown in FIGS. 5 and 6), or the work completion being automatically detected with the aforementioned method, control system 100 sends a command to control panel 150 to transport pallet PL5 located in workstation 500 to housing unit 200. In response to this command, control panel 150 moves dolly 331 such that dolly 331 is positioned in front of workstation 500. Control panel 150 then drives fork portion 333 of dolly 331 to place pallet PL5 onto dolly 331, and moves dolly 331 such that dolly 331 is positioned in front of a specified housing location within housing unit 200 (step S11). Control panel 150 then drives fork portion 333 of dolly 331, to house pallet PL5 in the specified housing location within housing unit 200 (step S12).

Next, assume that the machining of workpiece W2 by machine tool 400 has been completed. In response to this, control system 100 sends a command to control panel 150 to transport pallet PL2 to housing unit 200. In response to this command, control panel 150 moves dolly 331 such that dolly 331 is positioned in front of pallet PL2. Control panel 150 then drives fork portion 333 of dolly 331, to place pallet PL2 onto dolly 331 (step S15).

Next, control panel 150 moves dolly 331 such that dolly 331 is positioned in front of the specified housing location within housing unit 200. Control panel 150 then drives fork portion 333 of dolly 331, to house pallet PL2 in housing unit 200 (step S16).

<E. Method for Sharing Data>

Figure 11:
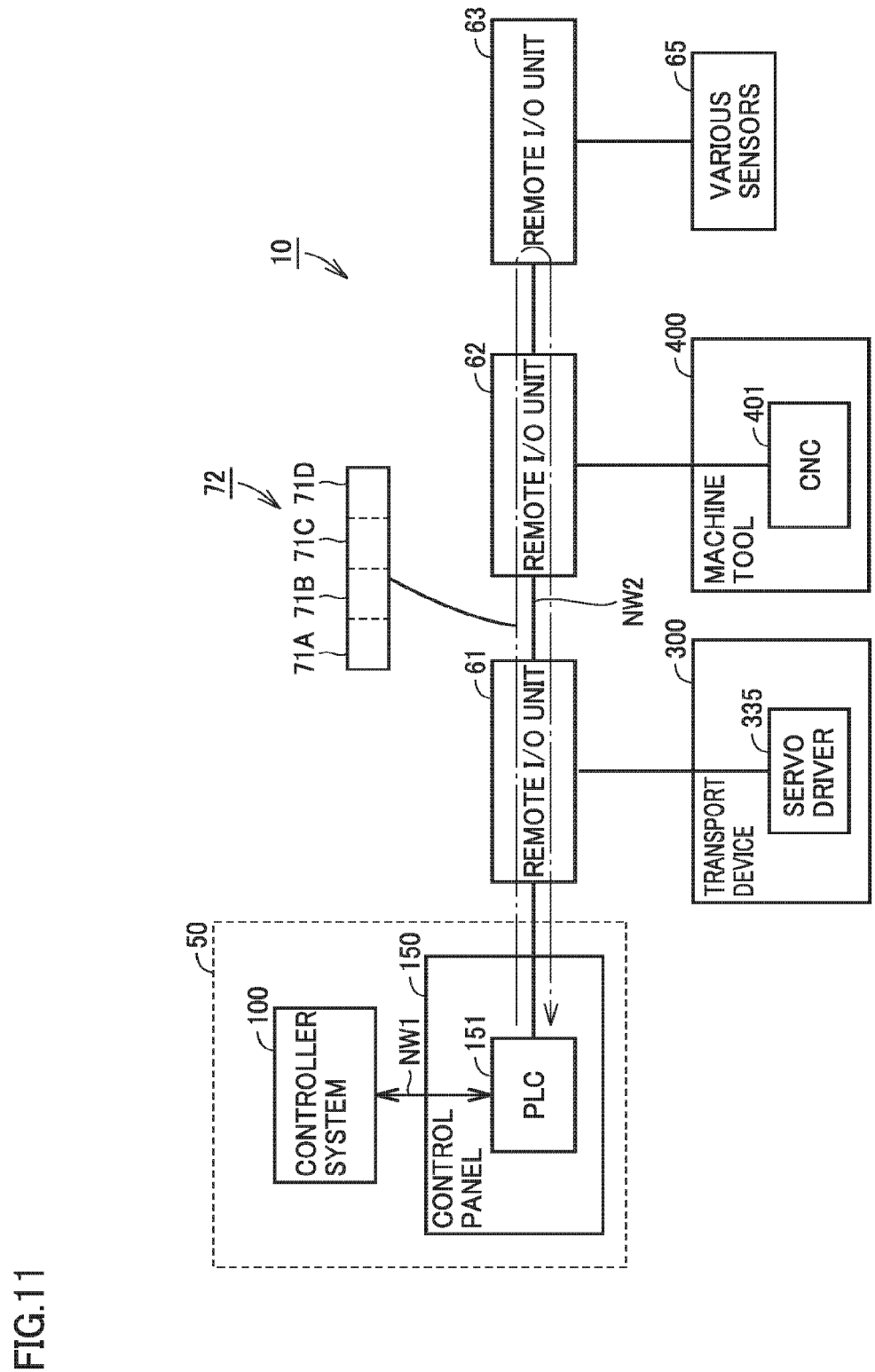
FIG. 11 is a conceptual diagram schematically illustrating cooperating relation among various devices forming the pallet transport system.

Referring to FIG. 11, a method for sharing data among the various devices forming pallet transport system 10 is described. FIG. 11 is a conceptual diagram schematically illustrating cooperating relation among the various devices forming pallet transport system 10.

As described above, control system 100 and PLC 151 are connected to network NW1 such as EtherNET. Remote I/O units 61 to 63 and PLC 151 are connected to network NW2 which is a field network.

A frame 72 is transmitted to network NW2. Frame 72 circulates over network NW2 in a predetermined control cycle. Remote I/O units 61 to 63 and PLC 151 share various types of data via frame 72.

Frame 72 has, for example, a data area 71A for PLC 151, a data area 71B for transport device 300 connected to remote I/O unit 61, a data area 71C for machine tool 400 connected to remote I/O unit 62, and a data area 71D for various sensors 65 connected to remote I/O unit 63.

Data area 71A of frame 72 is an area into which PLC 151 writes various types of data. An instruction to transport pallet PL and the like are written into data area 71A. This transport instruction includes a destination of pallet PL. This destination is represented, for example, as an identification number indicating a storage location within housing unit 200 (for example, an ID (Identification) indicating the storage location), or an identification number for identifying machine tool 400 (for example, an ID of the machine tool). The various types of data written into data area 71A by PLC 151 may be referred to by the various devices connected to network NW2.

Data area 71B of frame 72 is an area into which remote I/O unit 61 writes various types of data about transport device 300. The various types of data written into data area 71B are referred to by the various devices connected to network NW2.

Data area 71C of frame 72 is an area into which remote I/O unit 62 writes various types of data about machine tool 400. The various types of data written into data area 71C are referred to by the various devices connected to network NW2.

Data area 71D of frame 72 is an area into which remote I/O unit 63 writes output values from various sensors 65. As one example, the aforementioned work progress indicators are written into data area 71D of frame 72. The various types of data written into data area 71D are referred to by the various devices connected to network NW2. Aforementioned acquisition unit 152 (see FIG. 3) acquires the various work progress indicators by referring to data area 71D of frame 72.

<F. Hardware Configuration of Control System 100>

Figure 12:
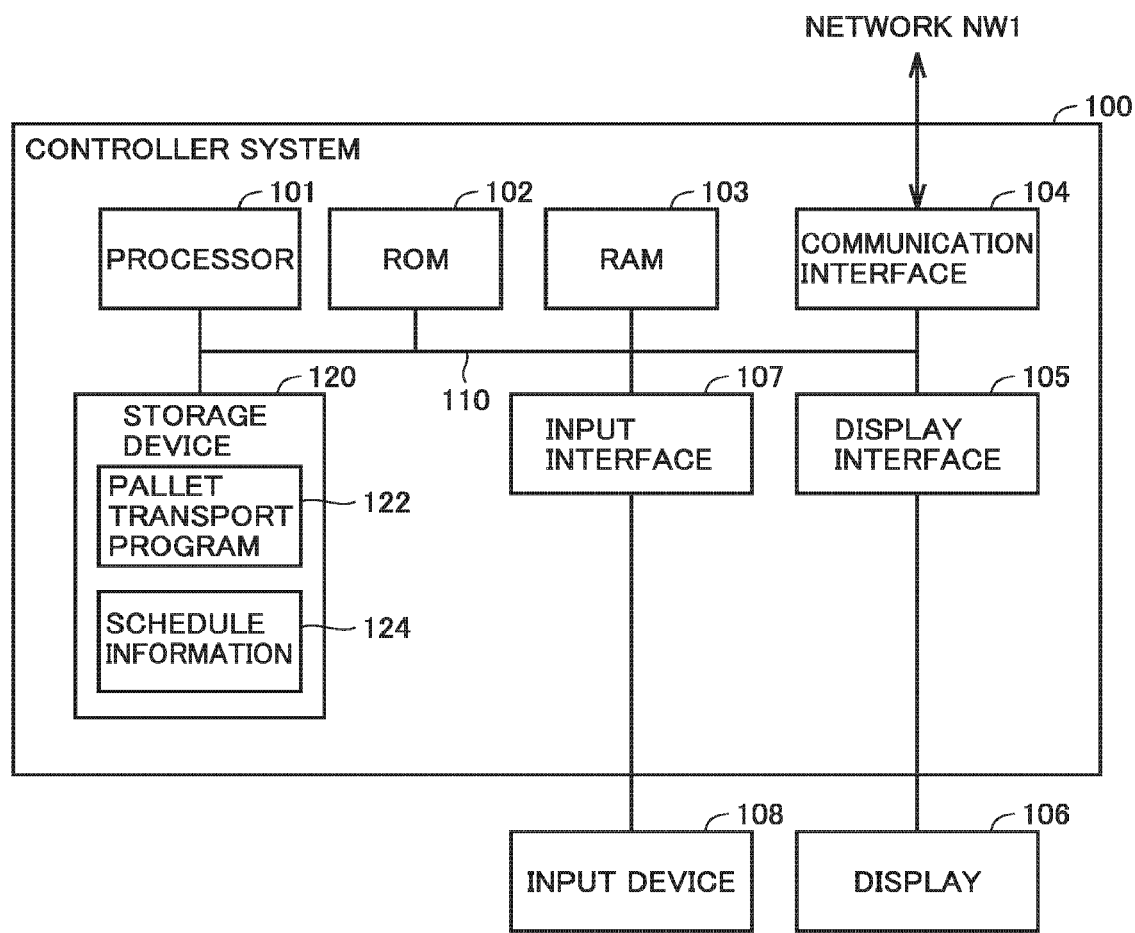
FIG. 12 is a schematic diagram showing an example hardware configuration of a control system.

Referring to FIG. 12, a hardware configuration of control system 100 is described. FIG. 12 is a schematic diagram showing an example hardware configuration of control system 100.

Control system 100 includes a processor 101, a ROM (Read Only Memory) 102, a RAM (Random Access Memory) 103, a communication interface 104, a display interface 105, an input interface 107, and a storage device 120. These components are connected to a bus 110.

Processor 101 is formed of, for example, at least one integrated circuit. The integrated circuit may be formed of, for example, at least one CPU (Central Processing Unit), at least one GPU (Graphics Processing Unit), at least one ASIC (Application Specific Integrated Circuit), at least one FPGA (Field Programmable Gate Array), or a combination thereof.

Processor 101 controls the operation of control system 100 by executing various programs such as a pallet transport program 122 and an operating system. In response to accepting an instruction to execute pallet transport program 122, processor 101 reads pallet transport program 122 from storage device 120 or ROM 102 to RAM 103. RAM 103 functions as a working memory, and temporarily stores various types of data required to execute pallet transport program 122.

A LAN (Local Area Network), an antenna and the like are connected to communication interface 104. Control system 100 is connected to network NW1 via communication interface 104. Control system 100 thus exchanges data with an external device connected to network NW1. This external device includes, for example, control panel 150 and a server (not shown). Control system 100 may be configured to be able to download pallet transport program 122 from this external device.

A display 106 is connected to display interface 105. Display interface 105 issues an image signal for displaying an image to display 106 in accordance with an instruction from processor 101 and the like. Display 106 is, for example, a liquid crystal display, an organic EL (Electro Luminescence) display, or another display device. Display 106 may be configured integrally with or separate from control system 100.

An input device 108 is connected to input interface 107. Input device 108 is, for example, a mouse, a keyboard, a touch panel, or another device capable of accepting a user's operation. Input device 108 may be configured integrally with or separate from control system 100.

Storage device 120 is a storage medium such as a hard disk or a flash memory. Storage device 120 stores pallet transport program 122, schedule information 124, and the like. Schedule information 124 specifies the order of transport of pallets (or workpieces), the priority of machining of workpieces, and the like. The storage location of pallet transport program 122 and schedule information 124 is not limited to storage device 120, and they may be stored in a storage area (for example, a cache memory) of processor 101, ROM 102, RAM 103, an external device (for example, a server), and the like.

Pallet transport program 122 may be provided not as an individual program, but by being incorporated into part of an appropriate program. In this case, a communication monitoring process by pallet transport program 122 is implemented in cooperation with the appropriate program. Even such a program that does not include some of modules does not depart from the gist of pallet transport program 122 according to the present embodiment. Moreover, some or all of the functions provided by pallet transport program 122 may be implemented by dedicated hardware. Moreover, control system 100 may be configured in the form of so-called cloud service in which at least one server executes part of the process of pallet transport program 122.

<G. Hardware Configuration of PLC 151>

Figure 13:
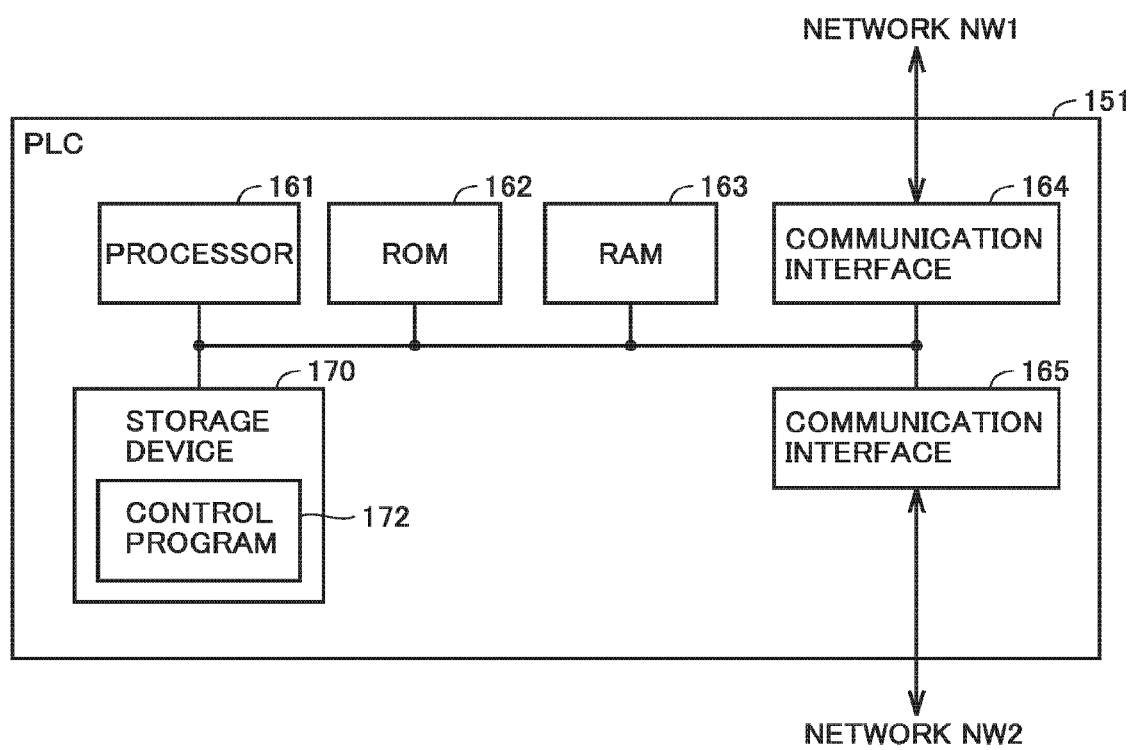
FIG. 13 is a block diagram showing a principal hardware configuration of a PLC.

Referring to FIG. 13, an example hardware configuration of PLC 151 is described. FIG. 13 is a block diagram showing a principal hardware configuration of PLC 151.

PLC 151 includes a processor 161, a ROM (Read Only Memory) 162, a RAM (Random Access Memory) 163, communication interfaces 164, 165, and a storage device 170.

Processor 161 is formed of at least one integrated circuit. The integrated circuit is formed of, for example, at least one CPU, at least one MPU (Micro Processing Unit), at least one ASIC, at least one FPGA, or a combination thereof.

Processor 161 controls the operation of transport device 300 and machine tool 400 by executing various programs such as a control program 172. In response to accepting an instruction to execute control program 172, processor 161 reads control program 172 from storage device 170 to ROM 162. RAM 163 functions as a working memory, and temporarily stores various types of data required to execute control program 172.

A LAN, an antenna and the like are connected to communication interface 164. PLC 151 is connected to network NW1 via communication interface 164. PLC 151 thus exchanges data with an external device connected to network NW1. This external device includes, for example, control system 100 and a server (not shown).

Communication interface 165 is an interface for connecting with network NW2 which is a field network. PLC 151 exchanges data with an external device connected to network NW2 via communication interface 165. This external device includes, for example, remote I/O units 61 to 63.

Storage device 170 is a storage medium such as a hard disk or a flash memory. Storage device 170 stores control program 172 and the like. The storage location of control program 172 is not limited to storage device 170, and it may be stored in a storage area (for example, a cache area) of processor 161, ROM 162, RAM 163, an external device (for example, a server), and the like.

Control program 172 may be provided not as an individual program, but by being incorporated into part of an appropriate program. In this case, the control process according to the present embodiment is implemented in cooperation with the appropriate program. Even such a program that does not include some of modules does not depart from the gist of control program 172 according to the present embodiment. Moreover, some or all of the functions provided by control program 172 may be implemented by dedicated hardware. Moreover, PLC 151 may be configured in the form of so-called cloud service in which at least one server executes part of the process of control program 172.

<H. Hardware Configuration of Machine Tool 400>

Figure 14:
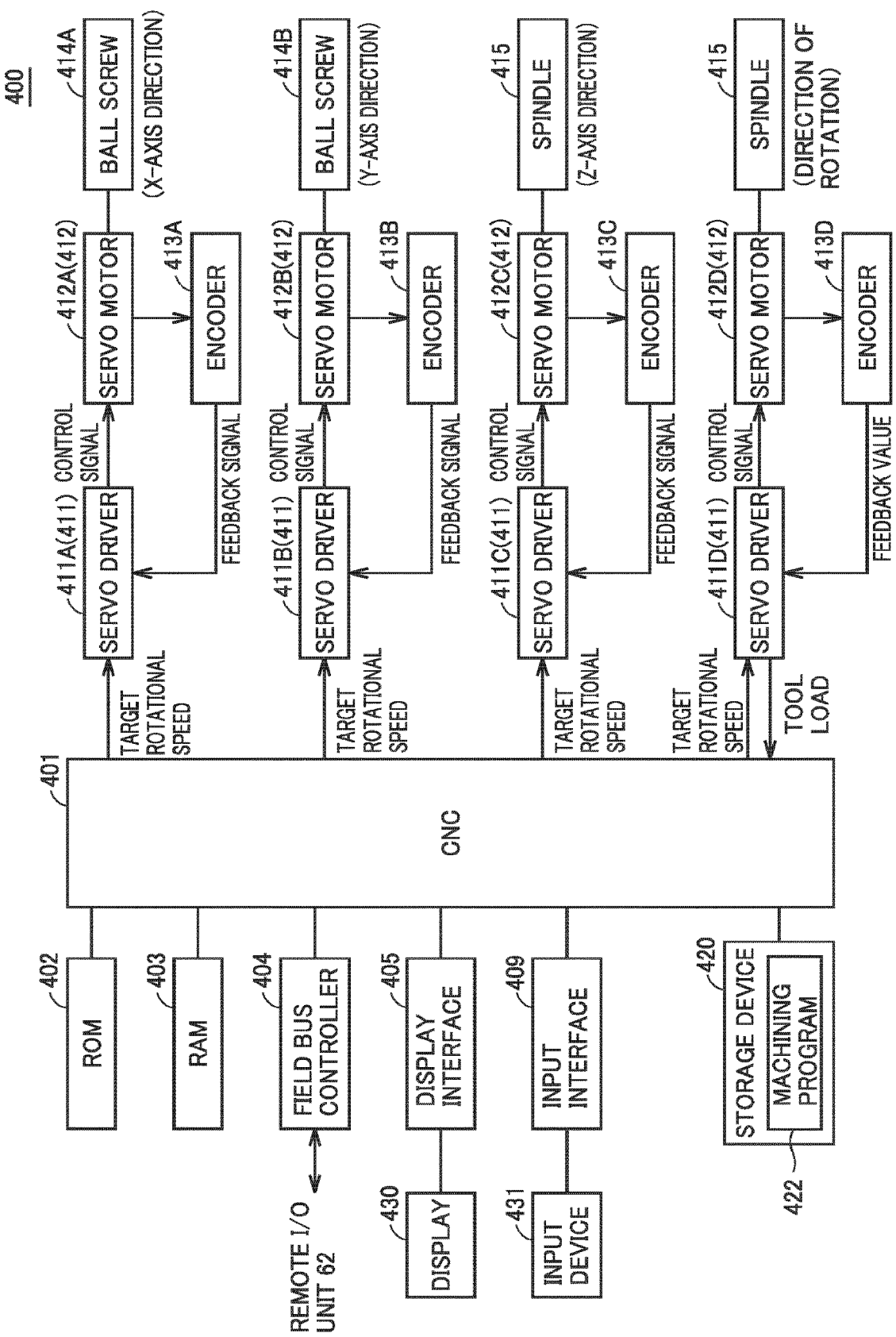
FIG. 14 is a block diagram showing a principal hardware configuration of a machine tool.

Referring to FIG. 14, an example hardware configuration of machine tool 400 is described. FIG. 14 is a block diagram showing a principal hardware configuration of machine tool 400.

Machine tool 400 includes CNC 401, a ROM 402, a RAM 403, a field bus controller 404, a display interface 405, an input interface 409, servo drivers 411A to 411D, servo motors 412A to 412D, encoders 413A to 413D, ball screws 414A, 414B, and spindles 415 for attaching the tools. These devices are connected via a bus (not shown).

CNC 401 is formed of at least one integrated circuit. The integrated circuit is formed of, for example, at least one CPU, at least one MPU, at least one ASIC, at least one FPGA, or a combination thereof.

CNC 401 controls the operation of machine tool 400 by executing various programs such as a machining program 422. In response to accepting an instruction to execute machining program 422, CNC 401 reads machining program 422 from a storage device 420 to ROM 402. RAM 403 functions as a working memory, and temporarily stores various types of data required to execute machining program 422.

Field bus controller 404 is an interface for implementing communication with PLC 151 via remote I/O unit 62. CNC 401 exchanges data with PLC 151 via field bus controller 404.

Display interface 405 is connected to a display device such as a display 430, and issues an image signal for displaying an image to display 430 in accordance with an instruction from CNC 401 and the like. Display 430 is, for example, a liquid crystal display, an organic EL display, or another display device.

Input interface 409 may be connected to an input device 431. Input device 431 is, for example, a mouse, a keyboard, a touch panel, or another input device capable of accepting a user's operation.

CNC 401 controls servo driver 411A in accordance with machining program 422. Servo driver 411A sequentially receives input of a target rotational speed (or a target position) from CNC 401, controls servo motor 412A such that servo motor 412A rotates at the target rotational speed, and drives a workpiece placement table (not shown) in an X-axis direction. More specifically, servo driver 411 A calculates an actual rotational speed (or an actual position) of servo motor 412A from a feedback signal of encoder 413A, and raises the rotational speed of servo motor 412A when the actual rotational speed is lower than the target rotational speed, and lowers the rotational speed of servo motor 412A when the actual rotational speed is higher than the target rotational speed. In this manner, servo driver 411A brings the rotational speed of servo motor 412A closer to the target rotational speed while sequentially receiving the feedback on the rotational speed of servo motor 412A. Servo driver 411A moves the workpiece placement table connected to ball screw 414A in the X-axis direction, to move the workpiece placement table to an appropriate position in the X-axis direction.

With similar motor control, servo driver 411B moves a workpiece placement table connected to ball screw 414B in a Y-axis direction in accordance with a control command from CNC 401, to move the workpiece placement table to an appropriate position in the Y-axis direction. With similar motor control, servo driver 411C moves spindle 415 in a Z-axis direction in accordance with a control command from CNC 401, to move spindle 415 to an appropriate position in the Z-axis direction. With similar motor control, servo driver 411D controls a rotational speed of spindle 415 in accordance with a control command from CNC 401.

Storage device 420 is a storage medium such as a hard disk or a flash memory. Storage device 420 stores machining program 422 and the like. The storage location of machining program 422 is not limited to storage device 420, and it may be stored in a storage area (for example, a cache area) of CNC 401, ROM 402, RAM 403, an external device (for example, a server), and the like.

<I. Control Flow>

Figure 15:
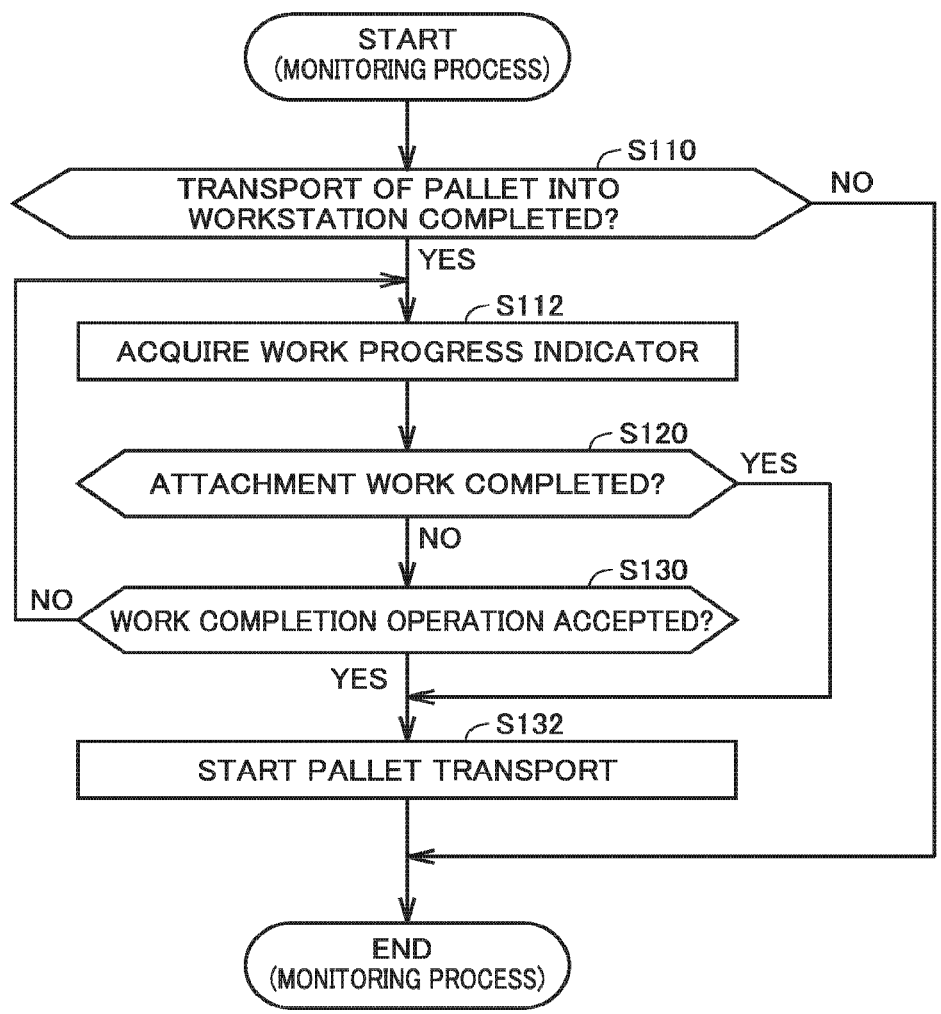
FIG. 15 is a flowchart representing part of a process performed by the control device.

Referring to FIG. 15, a control flow of control device 50 is described. FIG. 15 is a flowchart representing part of the process performed by control device 50.

In step S110, control device 50 determines whether or not the transport of pallet PL into workstation 500 has been completed. If it is determined that the transport of pallet PL into workstation 500 has been completed (YES in step S110), control device 50 switches the control to step S112. If not (NO in step S110), control device 50 ends the process shown in FIG. 15.

In step S112, control device 50 functions as aforementioned acquisition unit 152 (see FIG. 3), and acquires the work progress indicator. The function of acquisition unit 152 and the work progress indicator are as described in "C1. Acquisition Unit 152" above, and therefore the description thereof will not be repeated.

In step S120, control device 50 functions as aforementioned determination unit 154 (see FIG. 3), and determines whether or not the work of attaching workpiece W to pallet PL has been completed based on the work progress indicator acquired in step S112. The function of determination unit 154 is as described in "C2. Determination Unit 154" above, and therefore the description thereof will not be repeated. If it is determined that the work of attaching workpiece W to pallet PL has been completed (YES in step S120), control device 50 switches the control to step S132. If not (NO in step S120), control device 50 switches the control to step S130.

In step S130, control device 50 determines whether or not the work completion operation has been accepted. As one example, control device 50 determines that the work completion operation has been accepted in response to detecting the depression of aforementioned work completion button BT (see FIGS. 5 and 6) located in workstation 500. If it is determined that the work completion operation has been accepted (YES in step S130), control device 50 switches the control to step S132. If not (NO in step S130), control device 50 returns the control to step S112.

In step S132, control device 50 functions as aforementioned output unit 156 (see FIG. 3), and outputs to transport device 300 an instruction to transport pallet PL located in workstation 500. This transport instruction includes a destination of pallet PL. This destination is represented, for example, as an identification number indicating a storage location within housing unit 200 (for example, an ID indicating the storage location), or an identification number for identifying machine tool 400 (for example, an ID of the machine tool).

<J. Summary>

In a manner described above, pallet transport system 10 acquires the indicator indicating the progress of the work of attaching the workpiece to pallet PL (that is, the work progress indicator), and determines whether or not the work of attaching the workpiece has been completed based on the work progress indicator. If it is determined that the work of attaching the workpiece has been completed, workstation 500 forcibly starts the transport of pallet PL out of workstation 500.

Accordingly, the working process is moved to the next step even if the worker forgets to perform the work completion operation (for example, the operation of depressing work completion button BT shown in FIGS. 5 and 6). As a result, reduction in productivity of workpieces due to the work completion operation being forgotten is prevented.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

10 pallet transport system; 50 control device; 61, 62, 63 remote I/O unit; 65 various sensors; 71A, 71B, 71C, 71D data area; 72 frame; 100 control system; 101, 161 processor; 102, 162, 402 ROM; 103, 163, 403 RAM; 104, 164, 165 communication interface; 105, 405 display interface; 106, 430 display; 107, 409 input interface; 108, 431 input device; 110 bus; 120, 170, 420 storage device; 122 pallet transport program; 124 schedule information; 150 control panel; 151 PLC; 152 acquisition unit; 154 determination unit; 156 output unit; 172 control program; 200 housing unit; 300 transport device; 330 rail; 331 dolly; 333 fork portion; 334, 411, 411A, 411B, 411C, 411D servo driver; 335, 412, 412A to 412D servo motor; 400 machine tool; 401 CNC; 404 field bus controller; 413A to 413D encoder; 414A, 414B ball screw; 415 spindle; 422 machining program; 500 workstation; 510 camera; 511 open/close sensor; 513 clamp sensor; 515 area sensor; 515A light projecting unit; 515B light receiving unit.

The invention claimed is:

1. A pallet transport system comprising:
   a transport device for transporting a pallet to which a workpiece can be attached;
   a pallet housing unit for housing the pallet, the pallet housing unit being one of destinations to which the pallet is to be transported by the transport device;
   a workstation in which a worker is to conduct work of attaching the workpiece to the pallet transported from the pallet housing unit, the workstation being one of destinations to which the pallet is to be transported by the transport device, the work station including a button for accepting an operation indicating completion of the attachment work by the worker;
   a machine tool for machining the workpiece attached to the pallet in the workstation, the machine tool being one of destinations to which the pallet is to be transported by the transport device; and
   a control device for controlling the transport device,
   wherein the control device is configured to:
      acquire an indicator indicating progress of the attachment work in the workstation,
      determine, regardless of whether or not the operation indicating completion has been accepted, whether or not the attachment work has been completed based on the indicator, and
      transport the pallet located in the workstation to the pallet housing unit or the machine tool when it is determined that the attachment work has been completed.

2. The pallet transport system according to claim 1, further comprising a camera arranged to take an image of at least one of the pallet located in the workstation, and the worker conducting the attachment work in the workstation, wherein
   the control device
   acquires the image obtained from the camera as the indicator, and
   determines whether or not the attachment work has been completed based on the image.

3. The pallet transport system according to claim 1, wherein
   the workstation includes a clamp sensor for sensing a physical quantity indicating strength of fixation of the workpiece to a jig attached to the pallet, and
   the control device
   acquires the physical quantity sensed by the clamp sensor as the indicator, and
   determines that the attachment work has been completed in response to magnitude of the physical quantity exceeding a prescribed value.

4. A pallet transport system comprising:
   a transport device for transporting a pallet to which a workpiece can be attached;
   a pallet housing unit for housing the pallet, the pallet housing unit being one of destinations to which the pallet is to be transported by the transport device;
   a workstation in which a worker is to conduct work of attaching the workpiece to the pallet transported from the pallet housing unit, the workstation being one of destinations to which the pallet is to be transported by the transport device, the workstation further includes a door that can be opened and closed for separating a place to which the pallet is transported in the workstation from a work area in which the attachment work is conducted, and an open/close sensor for sensing an open/closed state of the door;
   a machine tool for machining the workpiece attached to the pallet in the workstation, the machine tool being one of destinations to which the pallet is to be transported by the transport device; and
   a control device for controlling the transport device,
   wherein the control device is configured to:
      acquire an indicator indicating progress of the attachment work in the workstation,
      determine whether or not the attachment work has been completed based on the indicator, and when it is determined that the attachment work has been completed, transports the pallet located in the workstation to the pallet housing unit or the machine tool,
      acquire the open/closed state sensed by the open/close sensor as the indicator, and
      determine that the attachment work has been completed in response to the open/close sensor sensing the closed state of the door.

5. A pallet transport system comprising:
   a transport device for transporting a pallet to which a workpiece can be attached;
   a pallet housing unit for housing the pallet, the pallet housing unit being one of destinations to which the pallet is to be transported by the transport device;
   a workstation in which a worker is to conduct work of attaching the workpiece to the pallet transported from the pallet housing unit, the workstation being one of destinations to which the pallet is to be transported by the transport device;

a machine tool for machining the workpiece attached to the pallet in the workstation, the machine tool being one of destinations to which the pallet is to be transported by the transport device; and a control device for controlling the transport device, wherein the control device acquires an indicator indicating progress of the attachment work in the workstation, determines whether or not the attachment work has been completed based on the indicator, and when it is determined that the attachment work has been completed, transports the pallet located in the workstation to the pallet housing unit or the machine tool, the workstation further includes an area sensor, the area sensor including a light projecting unit, and a light receiving unit for receiving light emitted from the light projecting unit and outputting intensity of the light, and the light projecting unit being arranged such that the light emitted from the light projecting unit passes between a place to which the pallet is transported in the workstation and a work area in which the attachment work is conducted, and the control device acquires the intensity of the light output by the light receiving unit as the indicator, and determines that the attachment work has been completed in response to a time during which the intensity of the light is higher than a prescribed value exceeding a prescribed time.

6. A pallet transport method in a pallet transport system, the pallet transport system comprising:

a transport device for transporting a pallet to which a workpiece can be attached;

a pallet housing unit for housing the pallet, the pallet housing unit being one of destinations to which the pallet is to be transported by the transport device;

a workstation in which a worker is to conduct work of attaching the workpiece to the pallet transported from the pallet housing unit, the workstation being one of destinations to which the pallet is to be transported by the transport device; and a machine tool for machining the workpiece attached to the pallet in the workstation, the machine tool being one of destinations to which the pallet is to be transported by the transport device, the work station including a button for accepting an operation indicating completion of the attachment work by the worker, and the pallet transport method comprising:

acquiring an indicator indicating progress of the attachment work;

determining, regardless of whether or not the operation indicating completion has been accepted, whether or not the attachment work has been completed based on the indicator; and when it is determined that the attachment work has been completed, transporting the pallet located in the workstation to the pallet housing unit or the machine tool.

7. A computer-readable storage medium storing a pallet transport program for execution in a pallet transport system, the pallet transport system comprising:

a transport device for transporting a pallet to which a workpiece can be attached;

a pallet housing unit for housing the pallet, the pallet housing unit being one of destinations to which the pallet is to be transported by the transport device;

a workstation in which a worker is to conduct work of attaching the workpiece to the pallet transported from the pallet housing unit, the workstation being one of destinations to which the pallet is to be transported by the transport device; and a machine tool for machining the workpiece attached to the pallet in the workstation, the machine tool being one of destinations to which the pallet is to be transported by the transport device, the work station including a button for accepting an operation indicating completion of the attachment work by the worker, and the pallet transport program causing the pallet transport system to:

acquire an indicator indicating progress of the attachment work;

determine, regardless of whether or not the operation indicating completion has been accepted, whether or not the attachment work has been completed based on the indicator; and when it is determined that the attachment work has been completed, transport the pallet located in the workstation to the pallet housing unit or the machine tool.

* * * * *